A. PEARCE.
Compression-Cocks.
No. 134,095. Patented Dec. 17, 1872.
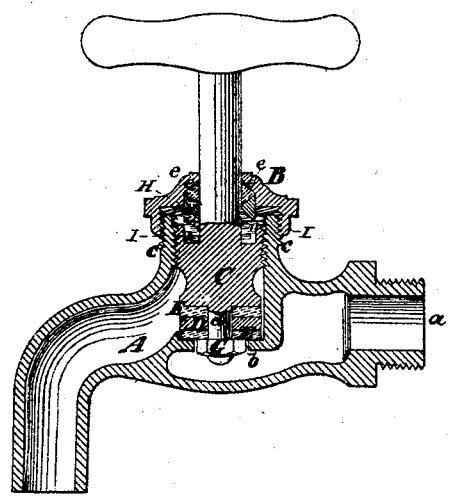
Witnesses:
Albert Pearce
per Brown & Allen
Attorneys

UNITED STATES PATENT OFFICE.

ALBERT PEARCE, OF CAMBRIDGEPORT, MASSACHUSETTS.

IMPROVEMENT IN COMPRESSION-COCKS.

Specification forming part of Letters Patent No. 134,095, dated December 17, 1872.

*To all whom it may concern:*

Be it known that I, ALBERT PEARCE, of Cambridgeport, in the county of Middlesex and State of Massachusetts, have invented an Improvement in Compression-Cocks, of which the following is a specification:

This invention consists in the combination, with the valve or stopple of the cock, of two washers, of leather, wood, or soft metal, or any other soft material, and an interposed washer of hard material, the three swiveled to the end of said plug, whereby a very perfect closing of the cock is provided for and wear very materially lessened. It also consists in the combination, with a recess in the inner side of the cap of the cock, of a loose cup surrounding the stem of the valve, and a spring interposed between said cup and the valve whereby the cup is forced up toward the cap and a self-adjusting packing produced.

The accompanying drawing represents a central longitudinal section of a cock made according to my invention.

A is the body or shell of the cock. It is provided with an ordinary nipple, $a$, for its attachment to a pipe or other article containing water to be drawn, and is furnished, as usual, with a valve-seat, $b$. Opposite this seat, on the upper side of the shell, is a socket, $c$, on which screws the cap B. C is the valve or stopple which screws within the socket $c$, and is provided with a stem or shank, which extends through the cap B, and is provided with a handle for the manipulation of the valve. D E E are three washers which are swiveled to the valve by a shank, $d$, formed thereon, and retained in place by a nut, G, screwed on the end of the shank. The center washer D consists of a plate of brass or other hard material, and the washers E E, between which it is situated, are of leather, wood, soft metal, or other soft material. In the inner side of the cap B there is a central recess, $e$, and immediately opposite it is a cup, H, which surrounds the shank of the valve and is free to slide longitudinally thereon. The cup and recess in the cap together form a stuffing-box, which is filled with packing in the usual manner. Between this cup and a recess in the upper side of the valve there is interposed a spiral spring, I, which surrounds the shank of said valve and forces the aforesaid cup up toward the cap, and forces the packing interposed between them out against the shank of the valve.

The cock is opened and closed in the ordinary manner by screwing the valve further into or out of the socket. As the valve is turned the washers being swiveled thereto turn very little, and in turning the valve rubs on the upper washer E instead of causing the lower to rub on the seat, as does a washer secured to a cock in the ordinary way, and consequently there is very little wear of the washer next the valve-seat, and a close fit is maintained.

The stuffing-box, by means of the loose cup and spring, is made self-adjusting, so that as the packing wears it is still forced out against the valve-shank.

Claims.

1. The combination, with the valve C, of the washer E, of soft material, and an interposed washer, D, of hard material, the whole swiveled to said valve, substantially as and for the purpose set forth.

2. The combination, with a recess in the inner side of the cap of the cock, of a loose cup surrounding the valve-stem, and a spring interposed between this cup and the valve, essentially as and for the purpose specified.

ALBERT PEARCE.

Witnesses:
HENRY PARSONS,
EDWARD O. EARLS.